(12) United States Patent
Chang et al.

(10) Patent No.: US 7,903,780 B2
(45) Date of Patent: *Mar. 8, 2011

(54) X-RAY ABLATION OF HYALURONAN HYDROGELS

(75) Inventors: So Eun Chang, Pohang-si (KR); Byung Mook Weon, Cambridge, MA (US); Jung Ho Je, Pohang-si (KR); Jun Seok Yeom, Pohang-si (KR); Sei Kwang Hahn, Pohang-si (KR)

(73) Assignee: Postech Academy-Industry Foundation, Gyeongsangbuk-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/487,862

(22) Filed: Jun. 19, 2009

(65) Prior Publication Data

US 2010/0322378 A1 Dec. 23, 2010

(51) Int. Cl.
*G21K 5/00* (2006.01)

(52) U.S. Cl. .......................................... 378/34; 378/35
(58) Field of Classification Search ............... 378/34–35
See application file for complete search history.

(56) References Cited

U.S. PATENT DOCUMENTS

2007/0036745 A1* 2/2007 Leshchiner et al. ....... 424/78.27
* cited by examiner

*Primary Examiner* — Hoon Song
(74) *Attorney, Agent, or Firm* — Christopher P. Maiorana, PC

(57) ABSTRACT

Disclosed is a method for ablating hyaluronan-based hydrogels with X-rays, the method comprising the steps of: (a) preparing hyaluronan-based hydrogels; and (b) performing X-ray irradiation to the hyaluronan-based hydrogels to induce a degradation of the hyaluronan-based hydrogels by a gel-to-sol transition during the X-ray irradiation. Disclosed is also a method for fabricating three-dimensional microchannels of hyaluronan hydrogels with a finely tunable X-ray ablation technique.

13 Claims, 5 Drawing Sheets

FIG 2
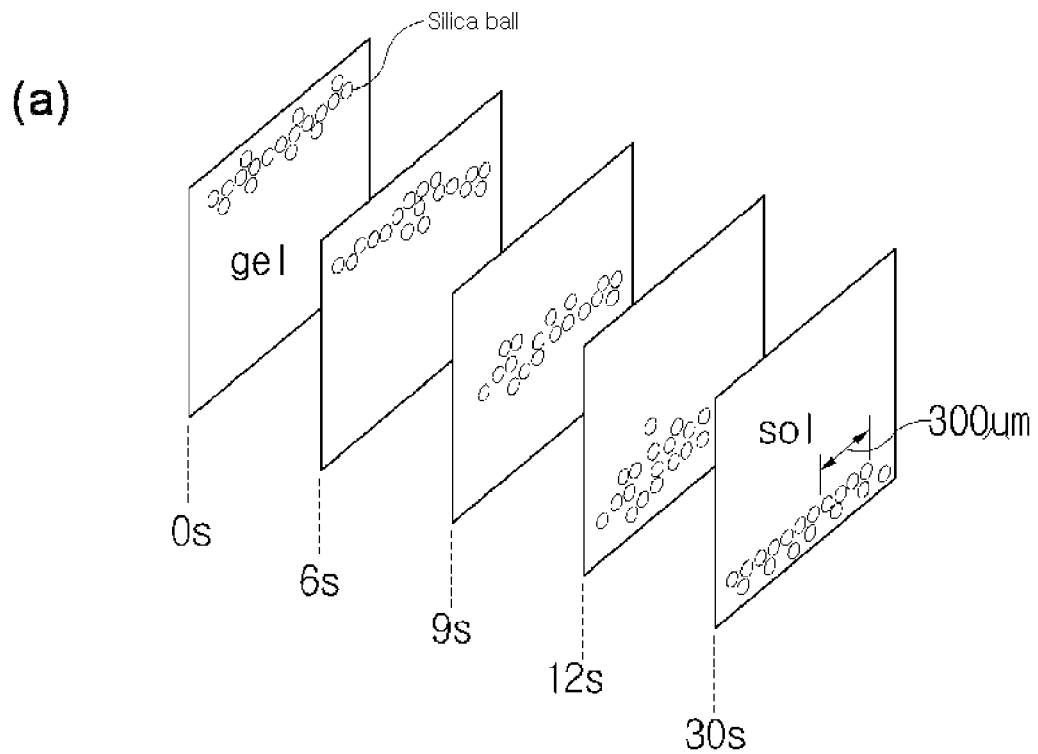
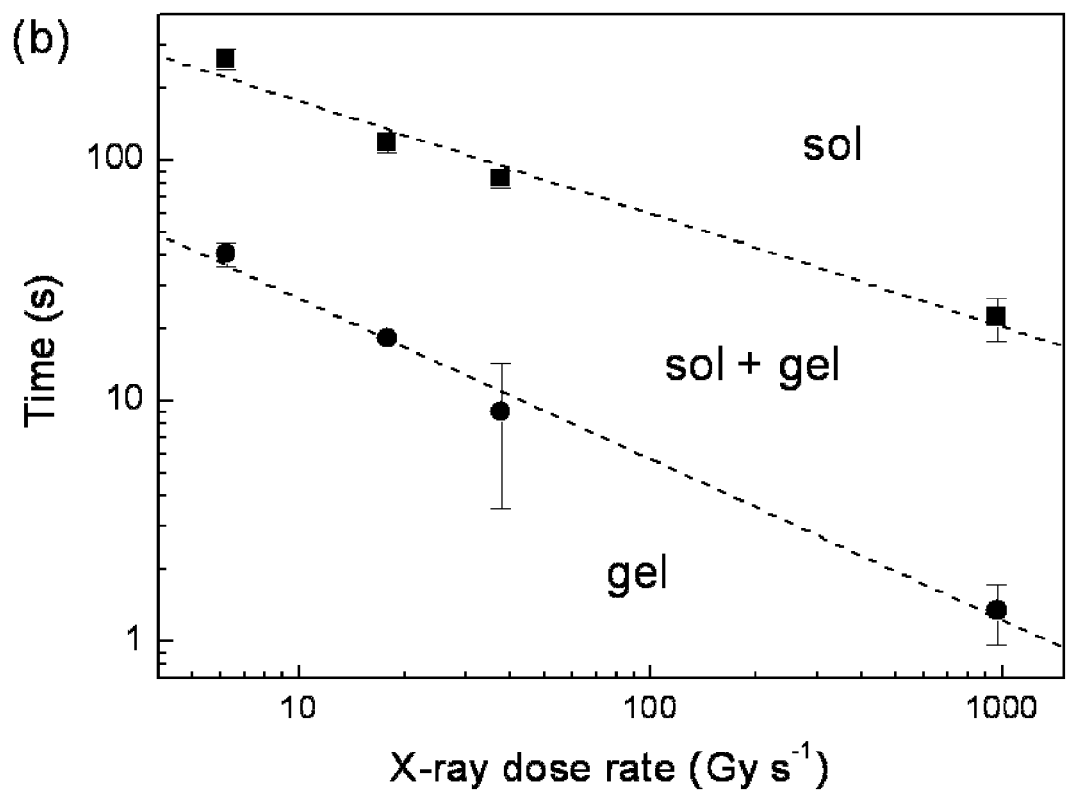

X-RAY ABLATION OF HYALURONAN HYDROGELS

BACKGROUND OF THE INVENTION

1. Field of the Invention

The present invention relates to a method for ablating hyaluronan-based hydrogels with X-rays and a method for fabricating three-dimensional microchannels of hyaluronan hydrogels with the X-ray ablation technique.

2. Background of the Related Art

Phase transition triggered by external perturbation is quite important for "intelligent materials" and a key issue in diverse fields ranging from biomedicine to chemistry, physics, and materials science.

Hydrogels-three-dimensional networks of crosslinked polymer chains-exhibit transitions in response to perturbations such as electric fields, temperature changes, pH changes, concentration changes, enzymes, electron beams, sound, and light. Hydrogels are actively studied with the objective to develop new technologies to control fluidity, viscoelasticity, solvent volatility, optical transmission, ion transport, and other properties.

Hyaluronan (salt form of hyaluronic acid, HA) is an important extracellular and cell-surface associated polysaccharide. It is commonly synthesized as a large, negatively charged, linear polysaccharide that is composed of repeating disaccharide units of glucuronic acid and N-acetylglucosamine: [–β(1,4)–GlcUA–β(1,3)–GlcNAc–]$_n$. HA has an important role in tissue homeostasis and biomechanical integrity via remarkable physicochemical characteristics such as viscoelastic and hygroscopic properties. These properties of HA lead to its widespread applications for bioengineered tissue scaffolds. Related physiological functions stimulate interest on its role in cell biology, pathology, immunology, and cancer research. The microfabrication of cell-laden HA architecture to resemble three-dimensional (3D) cellular microenvironments is also an important issue in HA. The HA molecular weight (MW) is, in general term, of critical importance because of its remarkable effects on cell activities. Although low MW HA, required for safe biomedical applications, is produced by enzymatic or non-enzymatic degradations, there are few reports on the safe, effective methods to fabricate 3D architectures of HA hydrogels.

As mentioned above, Hyaluronan hydrogels are promising materials for tissue scaffolds or cellular microenvironments, but it is still a great challenge to fabricate three-dimensional architectures.

SUMMARY OF THE INVENTION

Here we describe a versatile and robust protocol to fabricate three-dimensional microchannels of hyaluronan hydrogels with a finely tunable X-ray ablation technique. The principle of X-ray ablation is that polymer chains rapidly degrade by X-ray irradiation. This protocol will open new opportunities for tunable three-dimensional hydrogel architectures.

Therefore, it is the first object of the present invention to provide a method for ablating hyaluronan-based hydrogels with X-rays.

And, it is the second object of the present invention to provide a method for fabricating three-dimensional microchannels of hyaluronan hydrogels with X-ray ablation.

To accomplish the first object, according to one aspect of the present invention, there is provided a method for ablating hyaluronan-based hydrogels, the method comprising the steps of:

(a) preparing hyaluronan-based hydrogels; and
(b) performing X-ray irradiation to the hyaluronan-based hydrogels to induce a degradation of the hyaluronan-based hydrogels by a gel-to-sol transition during the X-ray irradiation.

Preferably, the X-ray irradiation may be performed using hard X-rays.

Preferably, the X-ray irradiation may be performed using X-rays in the range of 10-60 keV.

Preferably, the degradation kinetics of the hyaluronan-based hydrogels may be determined by total X-ray dose during the X-ray irradiation.

Preferably, the total X-ray dose to initiate the transition may be in the range of 0.2~1 J g$^{-1}$.

Preferably, the total X-ray dose to complete the transition may be in the range of 2~4 J g$^{-1}$.

To accomplish the second object, according to another aspect of the present invention, there is provided a method for fabricating three-dimensional microchannels of hyaluronan-based hydrogels with X-ray ablation, the method comprising the steps of:

(a) preparing hyaluronan-based hydrogels; and
(b) performing X-ray irradiation to the hyaluronan-based hydrogels via a mask transmitting X-rays locally to induce a degradation of the hyaluronan-based hydrogels by a gel-to-sol transition during the X-ray irradiation.

Preferably, the X-ray irradiation may be performed using hard X-rays.

Preferably, the X-ray irradiation may be performed using X-rays in the range of 10-60 keV.

Preferably, the depth and the width of the microchannels may be tunable by adjusting the X-ray dose and the mask width, respectively.

Preferably, the degradation kinetics of the hyaluronan-based hydrogels may be determined by the total X-ray dose during the X-ray irradiation.

Preferably, the total X-ray dose to initiate the transition may be in the range of 0.2~1 J g$^{-1}$.

Preferably, the total X-ray dose to complete the transition may be in the range of 2~4 J g$^{-1}$.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 2 shows (a) schematic view of Sequential in-situ microradiographs showing a gel-to-sol transition of ca. 1 mg of HA hydrogel crosslinked with DVS during X-ray irradiation of ca. 1 kGy s$^{-1}$. Spherical silica balls (~120 μm in diameter) initially remained in the top region of the 'gel' HA medium, and then fell down to the bottom of the capillary tube (ca. 1200 μm in diameter) during irradiation, clearly indicating a X-ray induced gel-to-sol transition, and shows (b) Sol-gel phase diagram for the X-ray dose rate and the irradiation time. The ablation (degradation) kinetics is determined by the total X-ray dose;

DETAILED DESCRIPTION OF THE PREFERRED EMBODIMENT

The preferred embodiments of the invention will be hereafter described in detail, with reference to the accompanying drawings.

Figure 1:
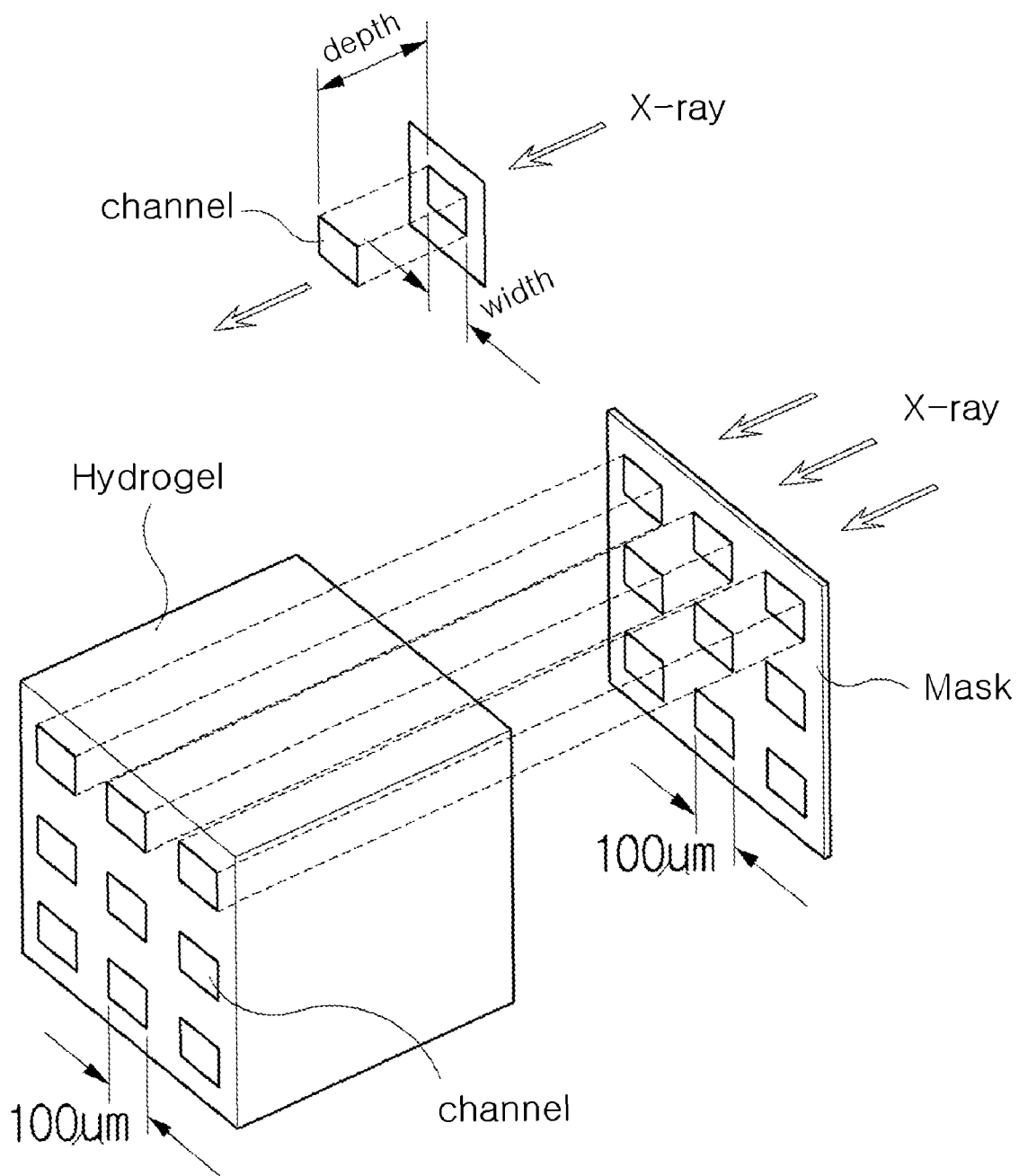
FIG. 1 shows Schematic illustration of X-ray ablation for HA hydrogels. The depth and the width in a single channel are tunable by adjusting the X-ray dose and the mask width, respectively. As an example, a HA architecture of 100-μm-width coherent microchannels fabricated using the X-ray ablation is demonstrated.

Here, we report a novel protocol using a short X-ray irradiation to ablate bulky HA hydrogels based on well controlled degradation kinetics: ca. 1 mg of HA rapidly degrades within 30 s of hard-X-ray irradiation, with the same specific cleavage as in enzymatic degradation. Based on using such a fast X-ray ablation process, we were able to fabricate three-dimensional HA hydrogel microchannels, as illustrated in FIG. 1. We note that the depth and the width in a single channel are tunable by adjusting the X-ray dose and the mask width, respectively. The X-ray irradiation of HA raw materials and HA-based hydrogels (crosslinked with divinyl sulfone) was performed using synchrotron hard X-rays (10-60 keV), which were also used to image the induced degradation in real time. The fast degradation kinetics is due to a rapid chain scission associated with the formation of carbonyl or carboxyl groups in the HA backbone. In general, the X-ray ablation of the HA-based hydrogels could be quite effective in cleaving bulky HA architecture for 3D cellular microenvironments.

FIG. 2a shows schematic views of representative in-situ microradiographs that demonstrate a real time gel-to-sol transition of HA hydrogel crosslinked with divinyl sulfone (DVS) during X-ray irradiation. Spherical silica balls (~120 μm in diameter) that initially stayed in the top region of the HA hydrogel, fell down to the bottom with irradiation time, clearly indicating the X-ray-induced gel-to-sol transition. The irradiated mass of the HA-DVS hydrogel (MW=232 kDa, density≈1 g cm$^{-3}$) was ca. 1 mg in a capillary tube (ca. 1200 μm in diameter). As already mentioned, the transition was very fast: this mass degraded within 30 s of irradiation.

The ablation kinetics depends on the X-ray dose rate (or flux) and on the irradiation time, as illustrated in the sol-gel phase diagram of FIG. 2b (the X-ray dose rate of FIG. 2a was ca. 1 kGy s$^{-1}$). However, it is the total X-ray dose (=the X-ray dose rate times the irradiation time) that actually determines the kinetics. The total dose required to 'initiate' the transition is approximately fixed and ≈0.2~1 J g$^{-1}$ (=kGy) (from the lower dashed line), as shown in FIG. 2b. The total dose to 'complete' the transition is also approximately fixed, ≈2~4 J g$^{-1}$ (from the upper dashed line). This suggests that the total energy (total X-ray dose) required for the transition is constant even if the flux changes. At a total dose of 1~2 J g$^{-1}$ the gel and the sol states coexist. These findings are important since they show that the degradation kinetics can be controlled by modifying the total dose.

Figure 3:
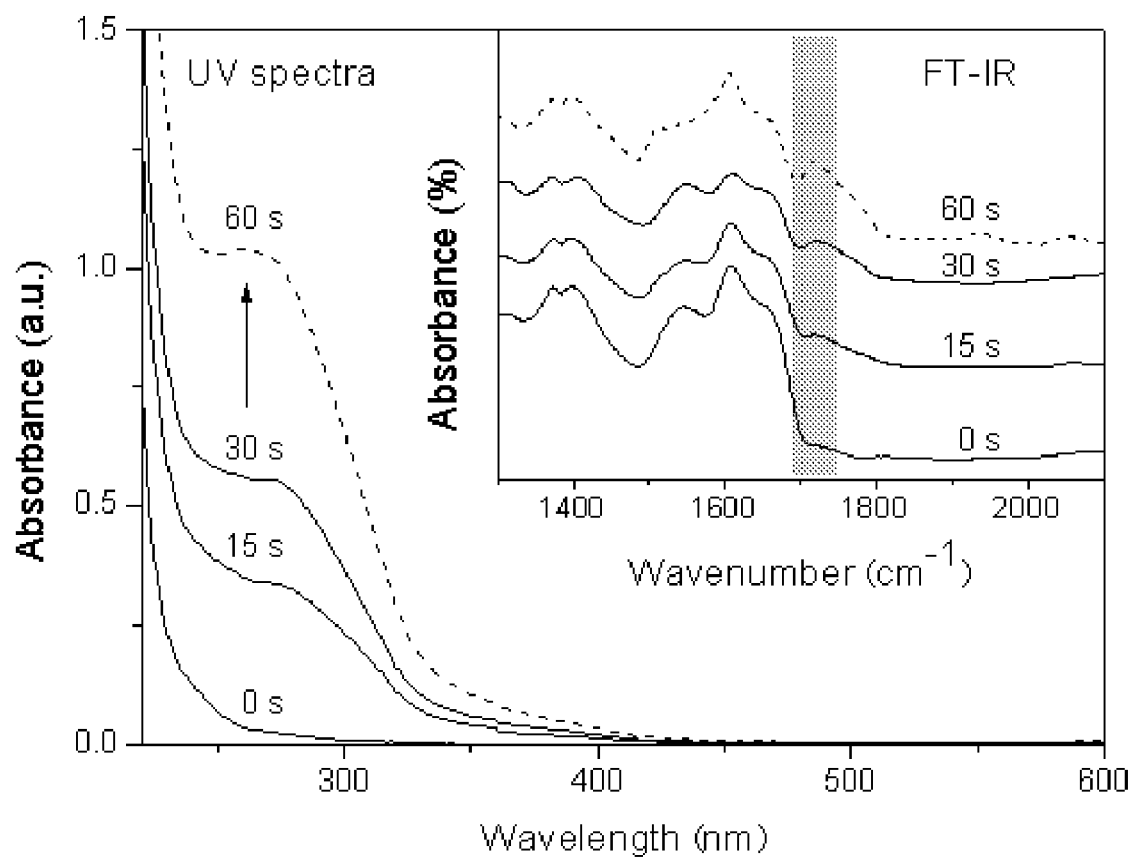
FIG. 3 shows UV spectra (main) and FT-IR spectra (inset) of HA-DVS hydrogel sample after irradiation with X-rays of ca. 1 kGy s$^{-1}$. The arrow and the gray zone indicate the absorption band evolution at 260~270 nm in the UV spectra and at 1700~1750 cm$^{-1}$ in the FT-IR spectra. The rapid band evolution within one minute indicates a rapid X-ray-induced chain scission in HA.
Figure 4:
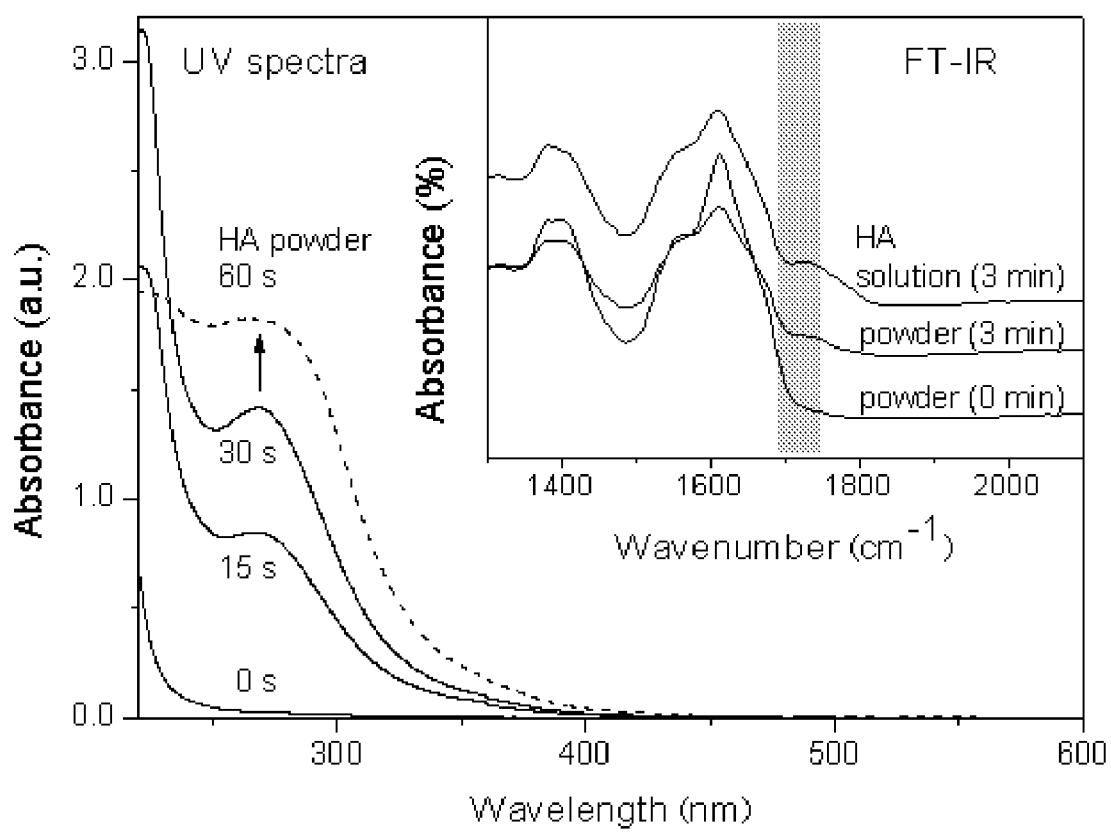
FIG. 4 shows UV spectra (main) and FT-IR spectra (inset) of HA raw materials (powders or solutions, MW=232 kDa) after irradiation with X-rays of ca. 1 kGy s$^{-1}$. The same band evolutions of HA raw materials and HA-DVS hydrogel suggest that the X-ray irradiation cleaves the HA backbone.
Figure 5:
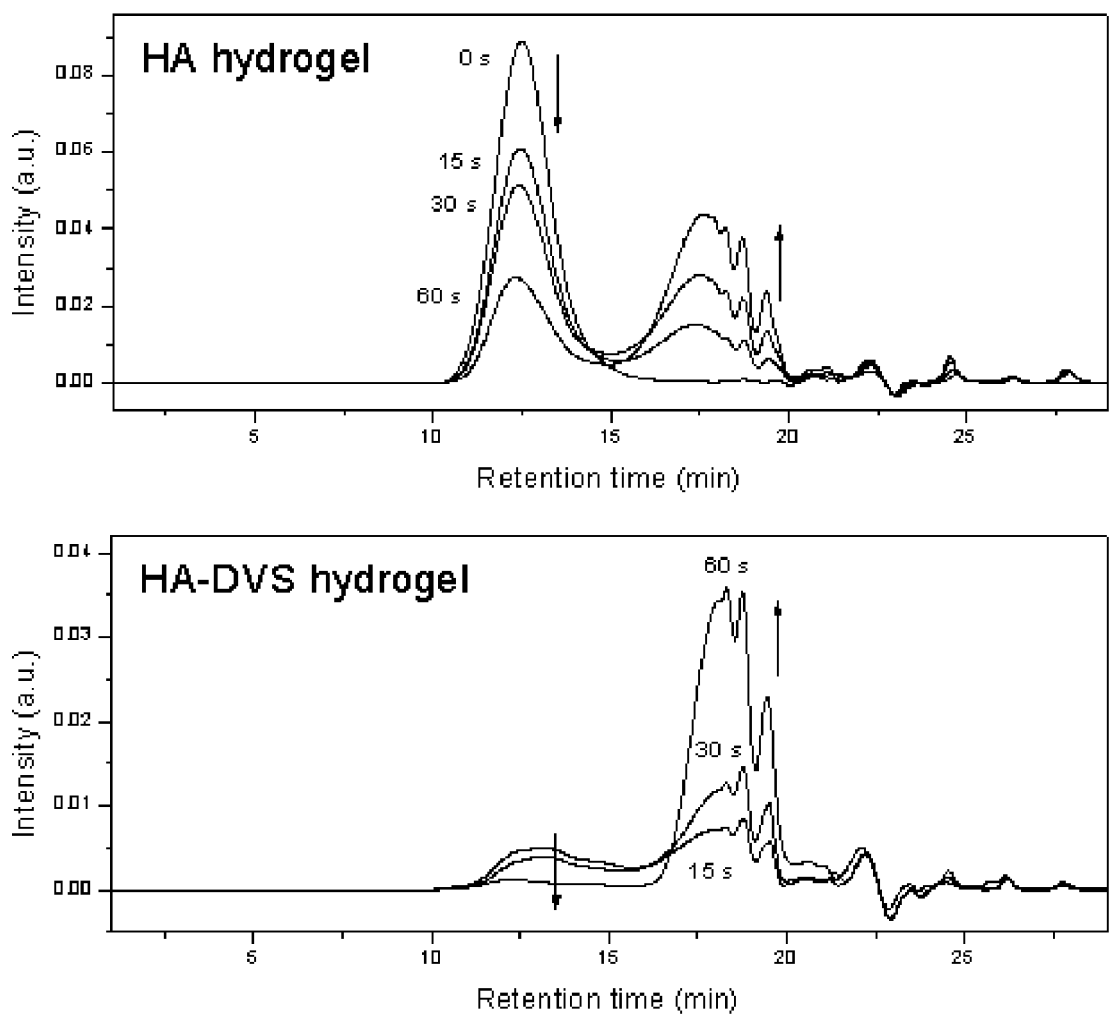
FIG. 5 shows GPC analysis of HA (MW=232 kDa) and HA-DVS hydrogel samples after X-ray irradiation up to 60 seconds. The GPC data show that the molecular weights of the HA hydrogels and the HA-DVS hydrogels significantly decreased with the X-ray irradiation (dose rate=1 kGy s$^{-1}$), indicating the chain scission by the X-ray irradiation.

We explain the principle of the X-ray ablation process. The HA-DVS hydrogel degradation at ca. 1 kGy s$^{-1}$ was monitored with UV and FT-IR spectroscopes (FIG. 3). The absorption band at 260~270 nm (indicated by the arrow) in the UV spectra is due to carbonyl or carboxyl groups. The intensity increase of the band with the irradiation time is due to the increase of the total dose-(see FIG. 2b). As shown in the FT-IR spectra in the inset of FIG. 3, a similar increase with the irradiation time is observed for the absorption band at 1700~1750 cm$^{-1}$ (indicated by the gray zone) that also corresponds to carbonyl or carboxyl groups. The same band evolutions were found in the UV and FT-IR spectra of the HA raw material (powders or solutions, MW=232 kDa) (FIG. 4). The UV and the FT-IR spectra of the two HA and HA-DVS hydrogel samples suggest that the X-ray irradiation cleaves the HA backbone. We note that the band evolution within one minute is quite marked in the UV and the FT-IR spectra, indicating that the irradiation-induced chain scission is very rapid. As shown in FIG. 5, gel permeation chromatography (GPC) detected a significant reduction of the molecular weight by X-ray irradiation in the HA and the HA DVS hydrogel samples. The splitting of the GPC spectra for hard X-rays is similar to the depolymerization process of HA by soft X-rays. This result corroborates the conclusion that the HA backbone is cleaved by X-ray irradiation. Also note that the X-ray-induced degradation of the HA-DVS hydrogels corresponds to no significant changes in the FT-IR spectra except for the band at 1700~1750 cm$^{-1}$, similar to enzyme-induced HA degradation. This indicates that the X-ray ablation process results from the controlled degradation of specific chains in the HA molecules. The formation of carbonyl or carboxyl groups is attributed to the scission of glycosidic linkages between monosaccharide units in HA. We thus conclude that the fast degradation kinetics is due to a rapid chain scission associated with the formation of carbonyl or carboxyl groups in the HA backbone.

To summarize, we presented a novel protocol for microfabrication of HA-based hydrogels with a short hard-X-ray irradiation (X-ray ablation). This protocol could be quite effective in cleaving bulky HA architecture for 3D cellular microenvironments. Compared to other approaches such as laser ablation, X-ray irradiation offers the advantages of high penetration, local irradiation, non-thermal character, and remote control—possibly opening up new opportunities in 3D HA hydrogel microfabrication for a variety of biological and medical applications.

In the preferred embodiments of the present invention are used experimental conditions as follows:

Materials: Sodium hyaluronate, sodium salt of hyaluronic acid (HA), with a molecular weight (MW) of 234 kDa was purchased from Lifecore Co. (Chaska, Minn.). HA with a MW over 2 million, under the trade name of Suvenyl®, was obtained from Chugai Pharmaceutical Co. (Tokyo, Japan). Divinyl sulfone (DVS) was purchased from Tokyo Chemical Industry Co. (Tokyo, Japan). Sodium hydroxide (NaOH) and methanol were obtained from Wako Pure Chemical Industries (Osaka, Japan). All the chemicals were used without further purification.

HA-DVS hydrogel preparation: HA (68 mg) was dissolved in 1.68 mL of 0.2N NaOH (pH=13). After complete dissolution, 20.02 μL of DVS was added to the HA solution for the crosslinking reaction with the hydroxyl groups of HA. The molar ratio of DVS to hydroxyl group was 1:1. The final precursor solution was mixed completely, and 100 μL of the solution were inserted into each one of 15 syringes (volume=1 mL). After incubation at 37° C. for 1 h to complete the crosslinking reaction for HA-DVS hydrogel preparation, the syringes were sealed with prewashed dialysis membrane tube (MWCO of 7 kDa) and dialyzed against PBS for 24 h. The ions (Na$^+$ and OH$^-$) diffused out through the dialysis membrane neutralizing the pH inside HA-DVS hydrogels X-ray irradiation and real-time phase-contrast X-ray microscopy: The X-ray irradiation and the real-time phase-contrast X-ray imaging were performed using hard X-rays (10-60 keV) at the 7B2 beamline available at the Pohang Light Source (PLS) 2.5 GeV, 150 mA storage ring in Pohang, Korea. Spatially-coherent synchrotron X-rays were used to track the detailed gel-to-sol transition during X-ray irradiation, using a CdWO$_4$ scintillator crystal and a CCD (charge-coupled device) camera. The scintillator-specimen distance was set at 150 mm to optimize phase-contrast enhancement. The beam spot size was tuned to 1.50×1.13 mm$^2$ and the microradiology spatial resolution was 0.5 µm. The X-ray dose rate was controlled by adding silicon attenuators and measured with a previously calibrated ion chamber. The sequential microradiographs were taken with an interval time (acquisition time of 0.1 s and data transmission time of 0.4 s) of 0.5 s. Sequential snapshots in a movie were treated with the Image-Pro Plus software.

UV, FT-IR, GPC measurements: UV absorption spectra were obtained using SHIMADZU UV-2550 spectrophotometer at the range of 220-600 nm. FT-IR spectra were measured at a spectral resolution of 4 cm$^{-1}$ with a Bomem DA8 FT-IR spectrometer equipped with a liquid nitrogen-cooled MCT detector. GPC analysis was performed using the following system: Waters 1525 binary HPLC pump, Waters 2487 dual λ absorbance detector, Waters 717 plus autosampler, Ultrahydrogel TM 1000 and TM 250 columns (7.8 mm×30 cm) (Milford, Mass., USA). Eluant was 34 mM phosphate buffer (pH 6.6)/methanol=80:20 (v/v) and the flow rate was 1 mL/min. Detection wavelength was 210 nm.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method for ablating hyaluronan-based hydrogels, the method comprising the steps of:
   (a) preparing hyaluronan-based hydrogels; and
   (b) performing X-ray irradiation to the hyaluronan-based hydrogels to induce a degradation of the hyaluronan-based hydrogels by a gel-to-sol transition during the X-ray irradiation.

2. The method according to claim 1, wherein the X-ray irradiation is performed using hard X-rays.

3. The method according to claim 1, wherein the X-ray irradiation is performed using X-rays in the range of 10-60 keV.

4. The method according to claim 1, wherein the degradation kinetics of the hyaluronan-based hydrogels is determined by total X-ray dose during the X-ray irradiation.

5. The method according to claim 4, wherein the total X-ray dose to initiate the transition is in the range of 0.2~1 J g$^{-1}$.

6. The method according to claim 4, wherein the total X-ray dose to complete the transition is in the range of 2~4 J g$^{-1}$.

7. A method for fabricating three-dimensional microchannels of hyaluronan-based hydrogels with X-ray ablation, the method comprising the steps of:
   (a) preparing hyaluronan-based hydrogels; and
   (b) performing X-ray irradiation to the hyaluronan-based hydrogels via a mask transmitting X-rays locally to induce a degradation of the hyaluronan-based hydrogels by a gel-to-sol transition during the X-ray irradiation.

8. The method according to claim 7, wherein the X-ray irradiation is performed using hard X-rays.

9. The method according to claim 7, wherein the X-ray irradiation is performed using X-rays in the range of 10-60 keV.

10. The method according to claim 7, wherein the depth and the width of the microchannels are tunable by adjusting the X-ray dose and the mask width, respectively.

11. The method according to claim 7, wherein the degradation kinetics of the hyaluronan-based hydrogels is determined by the total X-ray dose during the X-ray irradiation.

12. The method according to claim 7, wherein the total X-ray dose to initiate the transition is in the range of 0.2~1 J g$^{-1}$.

13. The method according to claim 7, wherein the total X-ray dose to complete the transition is in the range of 2~4 J g$^{-1}$.

* * * * *